Dec. 29, 1959   N. L. PETERSON   2,919,393
APPARATUS FOR CONTROL OF ELECTRIC SYSTEMS
Filed July 17, 1953
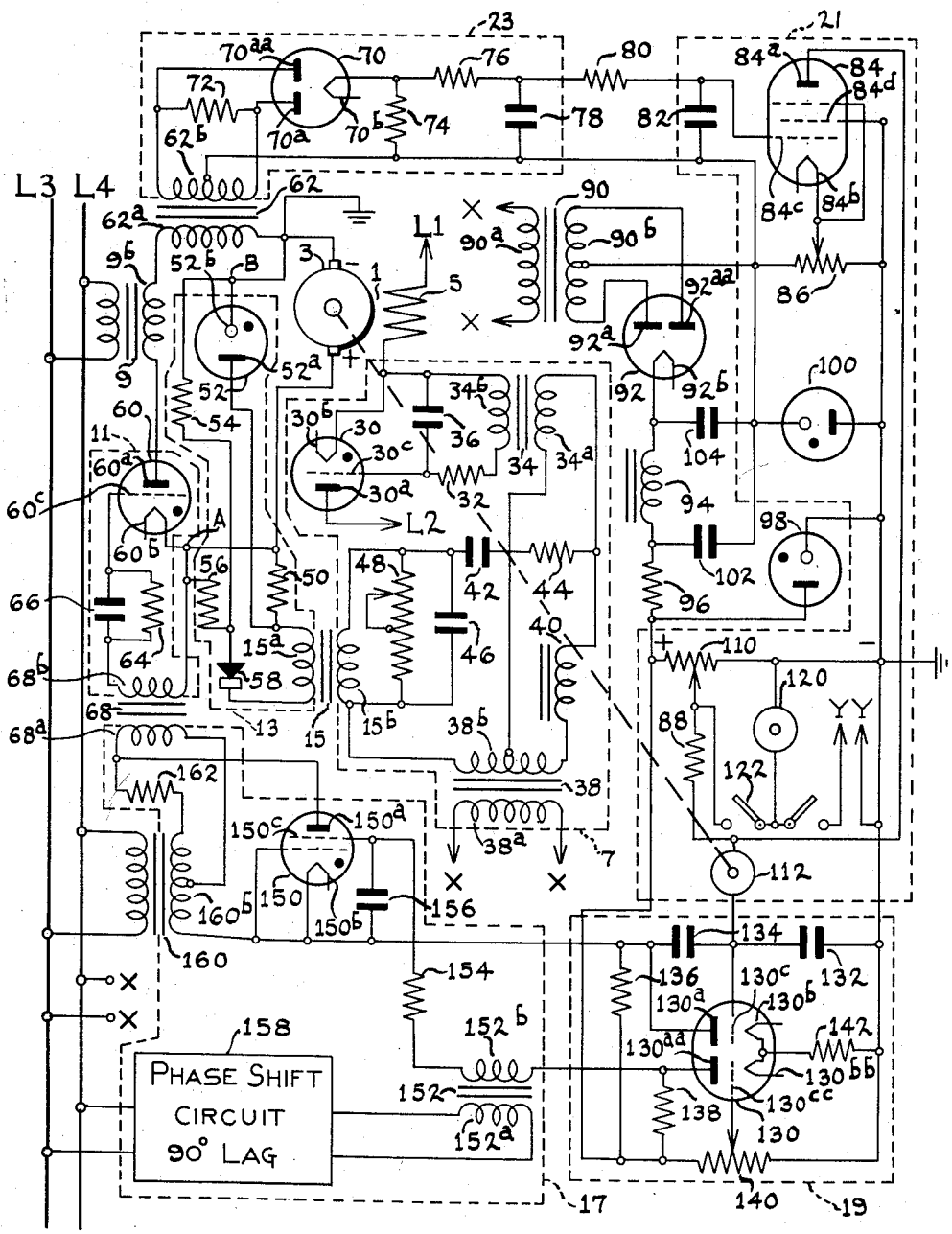

United States Patent Office 2,919,393
Patented Dec. 29, 1959

2,919,393

APPARATUS FOR CONTROL OF ELECTRIC SYSTEMS

Norman L. Peterson, Wauwatosa, Wis., assignor to Cutler-Hammer, Inc., Milwaukee, Wis., a corporation of Delaware Application July 17, 1953, Serial No. 368,584

13 Claims. (Cl. 318—308)

This invention relates to electric control methods and electric control circuits and systems, and more particularly relates to closed loop electronic motor control systems and control circuits therefor.

An object of the invention is to provide an improved method of controlling electrical apparatus.

Another object of the invention is to provide improved multiple feedback control systems. Such systems are required, in certain applications, to supply an input signal to a plurality of regulating devices, the signal to each device being variable as a different function of the fedback variables. An important application of this type of system is in the speed control of direct current motors; and a more specific object of the invention is to provide improved control systems for that purpose.

The speed of a direct current motor can be varied over a very wide range by varying the voltage applied to the armature of the motor over the lower portion of the desired speed range and by simultaneously varying the voltage applied to the armature and the current flowing in the field winding of the motor over the remaining or upper portion of said desired speed range. Another object of the invention is to provide a system which will control an electric motor in the aforedescribed manner with improved accuracy throughout the entire speed range and especially at the transition point between the upper and lower portions of the speed range.

Certain of these objects, and especially the last mentioned object, are attained in the invention by providing an improved, self-referencing, step-function circuit of the spillover type and an improved output limiting amplifier circuit. These two circuits, in addition to affording control circuits of the aforedescribed character, are useful independently of the remainder of the control circuit; and another object of the invention is to provide improved circuits of this type.

In control systems of the general character aforementioned, the signals at various stages of the system may be accurately and inexpensively amplified and controlled through the use of phase-shift controlled thyratron electron tubes. When direct current amplifier stages are also used because of certain advantages they afford, the voltages developed in the various stages of the system are added. Very high voltages appear between certain points in the system and ground, thus endangering operating personnel and increasing electrical insulation problems. Another object of the invention is to provide a system which utilizes thyratron control tubes and direct current amplifiers interconnected in a manner permitting grounding of the system at several points whereby the development of excessive potentials to ground is avoided.

Various other objects and advantages of the invention will hereinafter appear.

One embodiment of the invention is illustrated diagrammatically in the accompanying drawing which will now be described, it being understood that various modifications may be made therein without departing from the spirit of the invention or the scope of the appended claims.

In the drawing, the motor to be controlled is generally designated 1 and comprises an armature 3 and a field winding 5. Power for field winding 5 is supplied from a suitable alternating current source such as supply lines L1 and L2. The magnitude of the field current is controlled by a field-weakening, thyratron phase-shift circuit generally designated 7. Power for armature 3 is supplied from any suitable alternating current source such as alternating current supply lines L3 and L4 and anode transformer 9. The magnitude of the voltage applied across the armature 3 is controlled by an armature voltage control thyratron phase-shift circuit 11.

Operation of the field-weakening thyratron phase-shift circuit 7 is controlled, through the medium of a saturable reactor 15, by a spillover type circuit 13 as a function of the voltage applied to armature 3.

The operation of thyratron circuit 11 is controlled by a quadrature phase-shift and variable unidirectional voltage controlled thyratron circuit 17. The variable voltage for control of thyratron circuit 17 is developed by a long-tailed pair circuit 19 in accordance with a reference voltage representing desired motor speed, a feedback voltage representing actual motor speed and a feedback voltage representing the magnitude of the current flowing in armature 3. The latter feedback voltage is developed in an output limiting amplifier 21 in accordance with the output of a full-wave, diode rectifier circuit 23.

The field-weakening phase-shift circuit 7 consists of a thyratron tube 30 having its anode $30^a$ and its cathode $30^b$ connected in series with field winding 5 and source L1, L2. The control electrode $30^c$ of the tube 30 is connected to cathode $30^b$ through the series circuit combination of a resistor 32 and the secondary winding $34^b$ of a field coupling transformer 34. The resistor 32 acts with a capacitor 36, connected between the control electrode $30^c$ and cathode $30^b$, to filter out abrupt voltage changes. The primary winding $34^a$ of transformer 34 is connected in the center leg of a phase-shift circuit. This circuit is powered by a supply transformer 38 having its primary winding $38^a$ connected to supply lines L3 and L4 at X X. The center-tapped secondary winding $38^b$ of transformer 38 is connected at one end to one end of primary winding $34^a$ through an inductor 40. The other end of secondary winding $38^b$ is connected to said one end of primary winding $34^a$ through the series circuit combination of the alternating current winding $15^b$ of saturable reactor 15, a capacitor 42 and a resistor 44. Connected in parallel with alternating current winding $15^b$, is a parallel circuit, one leg of which comprises a capacitor 46 and the other leg of which comprises an adjustable resistor 48. The other end of primary winding $34^a$ is connected to the center-tap of secondary winding $38^b$. The phase relationship between the source L1, L2 and the voltage applied across primary winding $34^a$, and thus the control voltage for tube 30, varies in accordance with the reactance of the saturable reactor 15. The reactance of the latter is determined by the magnitude of the unidirectional current permitted to flow, by the spillover circuit 13, in the direct current control winding $15^a$ of reactor 15. The phase-shift circuit 7 is adjusted in such manner that a selected maximum current is permitted to flow in field winding 5 when no current is flowing in winding $15^a$.

The field-weakening phase-shift circuit 7 is intended to be representative only. It will be apparent that other circuits, whether including a saturable reactor or not, may be substituted for the circuit 7 shown.

The spillover type circuit 13 is connected between points A and B in parallel with the armature 3 and comprises, in a first branch circuit connected in series from the positive terminal of armature 3, a resistor 50, the anode 52ᵃ of a cold-cathode voltage regulator tube 52 and the cathode 52ᵇ of tube 52. A second branch, connected in parallel with said first branch, comprises a resistor 54 connected in series with a resistor 56. The latter resistor 56 is connected to the positive terminal of the armature 3. A third branch consists of direct current winding 15ᵃ of saturable reactor 15 and an asymmetric unit 58, such as a half-wave rectifier element connected in series circuit with and bridging the connection between resistors 54 and 56 with the connection between resistor 50 and anode 52ᵃ. The asymmetric unit 58 is polarized in a manner permitting current flow therethrough in the direction from the junction between resistors 54 and 56 and preventing current flow toward said junction.

The voltage applied to armature 3 is also applied to spillover circuit 13 between points A and B. When this voltage has a magnitude less than the firing voltage of the regulator tube 52, the tube, acting as an open circuit, prevents the flow of current from point A through resistor 56, asymmetric unit 58, winding 15ᵃ and tube 52 to point B. Said asymmetric unit 58 prevents current flow from point A to point B through resistor 50, winding 15ᵃ, asymmetric unit 58 and resistor 54. Thus no current flows in winding 15ᵃ and, as aforedescribed, the current in field winding 5 is constant at a selected maximum value. No current flows in resistor 50. Thus the full voltage applied between points A and B is applied to regulator tube 52. When this voltage is increased sufficiently to fire the tube 52 and the same is fired, current will flow from point A through resistor 50 and tube 52 to point B. The voltage drop across tube 52 will promptly be reduced to a lower constant operating value. Resistors 54 and 56 are selected so that the voltage drop across resistor 54, caused by current flow from point A to point B through resistor 56 and 54, will be equal to the operating voltage of tube 52 when the voltage applied to armature 3 has the magnitude above which field-weakening control is required. As the voltage applied to the armature 3 is increased beyond the latter value, the voltage across resistor 54 will increase but the voltage across the regulating tube 52 will remain constant. Accordingly, the voltage drop across asymmetric unit 58 and winding 15ᵃ, and therefore the current flowing in this circuit, will vary linearly with the voltage applied to armature 3 after the latter voltage has a value at which field-weakening is to begin.

It will be noted that no external, regulated source of reference voltage is required to determine the spillover voltage of circuit 13 as in prior spillover circuits. Circuit 13 is self-referencing and its operation is not affected by differences in the plate-voltage, plate-current characteristic curve of the regulating tube 52 in either the firing or deionizing regions of said characteristic curve. Any suitable, non-linear impedance element which affords a constant operating voltage may be substituted for regulating tube 52.

Armature 3 is connected in series in a loop circuit with the cathode 60ᵇ of a thyratron tube 60, the anode 60ᵃ of tube 60, secondary winding 9ᵇ of anode transformer 9 and the primary winding 62ᵃ of a current transformer 62. The anode current permitted to flow in tube 60, and therefore the voltage applied to armature 3, is controlled by the phase angle of an alternating current voltage applied to the control element 60ᶜ of tube 60. This voltage is applied across control element 60ᶜ and cathode 60ᵇ through a resistor 64 and a capacitor 66, which are connected in parallel and act to filter out abrupt voltage changes, from the secondary winding 68ᵇ of an armature coupling transformer 68.

The full-wave, diode rectifier circuit 23 includes a dual diode tube 70. One anode 70ᵃ of this tube is connected to one end of the secondary winding 62ᵇ of current transformer 62 and the other anode 70ᵃᵃ is connected to the other end of winding 62ᵇ. A load resistor 72 is connected between anodes 70ᵃ and 70ᵃᵃ. The cathode 70ᵇ of tube 70 and the center-tap of winding 62ᵇ are interconnected by a filter circuit which consists of a resistor 74 connected from cathode 70ᵇ to the center-tap of winding 62ᵇ, and a resistor 76 and a capacitor 78 connected in series circuit in parallel with resistor 74. The input signal to the rectifier circuit 23 is a voltage which is developed across secondary winding 62ᵇ and is proportional to the current flowing in armature 3. The output signal of the circuit 23 is a unidirectional voltage proportional to the current in armature 3 and is applied to the output limiting amplifier 21 through a coupling resistor 80 and a capacitor 82.

Anode power for the output limiter tube 84 and for the direct current amplifier 19, is supplied by a conventional full-wave electronic power supply which includes a power transformer 90 having a primary winding 90ᵃ connected to source L3, L4 at X X and a secondary winding 90ᵇ, and a dual diode rectifier tube 92 having its anodes 92ᵃ and 92ᵃᵃ connected one to each end of secondary winding 90ᵇ. The filter circuit includes, in series from the cathode 92ᵇ of tube 92 to the center-tap of winding 90ᵇ, a choke 94, a resistor 96, a cold-cathode regulating tube 98, and a cold-cathode regulating tube 100. The filter circuit further includes filter capacitors 102 and 104 which are respectively connected from the opposite sides of choke 94 to the center-tap of winding 90ᵇ. The connection between the regulating tubes 98 and 100 is grounded.

The output-limiting amplifier tube 84 is a high vacuum pentode tube and has an anode 84ᵃ, a cathode 84ᵇ, a control grid 84ᶜ and a screen grid 84ᵈ. The control grid 84ᶜ is connected through resistor 80 to the junction between resistor 76 and capacitor 78, and is further connected through capacitor 82 to the center-taps of secondary windings 62ᵇ and 90ᵇ. The screen grid 84ᵈ is connected to ground. The cathode 84ᵇ is connected to the tap of a potentiometer 86 which is connected in parallel with regulator tube 100. The anode 84ᵃ is connected through a load resistor 88 to the tap of the speed adjusting potentiometer 110 which is connected in parallel with regulator tube 98. A speed feedback tachometer generator 112, which is driven by motor 1, has one terminal connected to anode 84ᵃ.

The input signal to the output-limiting amplifier 21 is a unidirectional voltage proportional to the current in armature 3 and is impressed across capacitor 82. The output signal of the amplifier 21 is the voltage appearing between the other terminal of tachometer 112 and ground. This voltage is proportional to the difference between the actual speed of motor 1, represented by the voltage generated by tachometer 112, and the desired speed of motor 1 as represented by the voltage drop between the tap of potentiometer 110 and ground. When the current in armature 3 exceeds a selected value, determined by the setting of the tap of potentiometer 86, the output voltage of the amplifier 21 further includes a voltage which is developed across resistor 88 by tube 84 and which is proportional to the amount by which the armature current exceeds said selected value.

Anode current must begin to flow in tube 84 when the selected armature current is reached for every setting of the speed rheostat 110. This requirement is complicated by the fact that the speed signal may be required to vary in a ratio of 100 to 1 or more so that the anode voltage of tube 84 is varied over a very wide range. The circuit configuration of amplifier 21 permits adjustment of speed potentiometer 110 over its full range without affecting the plate current cut-off point of tube 84. This feature permits the desired speed signal and the current-limit signal to be introduced at the same point in the system. This is very desirable since it may be demonstrated mathematically that the stability of feedback control systems of this type is improved by introducing such signals as close as possible to the same point in the system.

In certain applications of the system it is desirable to control the speed of the motor in accordance with some varying standard. This standard need only be represented as a voltage and introduced into the circuit between the tap of potentiometer 110 and ground. In simultaneously controlling machine tools in a process line, for example, a tachometer 120, which is driven at the speed of the process line, is connected into the system by closing switch 122. Because the ground connection is made to one side of tachometer 120, other similar systems connected at Y Y may be simultaneously controlled.

The output voltage of the current-limit amplifier 21 is applied to a long-tailed pair circuit 19. This circuit includes a dual triode electron tube 130 (separate tubes may be used) one section of which comprises an anode 130$^a$, a cathode 130$^b$ and a control element 130$^c$ and the other section of which comprises an anode 130$^{aa}$, a cathode 130$^{bb}$ and a control electrode 130$^{cc}$. Said other terminal of tachometer 112 is connected to control electrode 130$^c$. The latter is connected to ground through a capacitor 132 and to anode 130$^a$ through a capacitor 134. Anode 130$^a$ iis connected to anode 130$^{aa}$ through the series circuit combination of resistors 136 and 138. The connection between resistors 136 and 138 is connected to the positive terminal of the unidirectional power supply between resistor 96 and regulator tube 98. A bias potentiometer 140 is connected between the latter terminal and ground; and the tap of potentiometer 140 is connected to control electrode 130$^{cc}$. The cathodes 130$^b$ and 130$^{cc}$ are tied together and are connected through a common cathode resistor 142 to ground.

The long-tailed pair circuit 19 is a bridge circuit, the center or output leg of which comprises the control electrode-cathode circuit of the thyratron tube 150 of the quadrature phase-shift and variable unidirectional voltage control circuit 17. The control electrode-cathode circuit is traced from anode 130$^{aa}$, through secondary winding 152$^b$ of an alternating grid voltage transformer 152 and a limiting resistor 154, to the control electrode 150$^c$ of tube 150, and thence through a by-pass capacitor 156 to the cathode 150$^b$ of tube 150 and anode 130$^a$ of tube 130. The primary winding 152$^a$ of transformer 152 is connected to source L3, L4 through a phase-shift network 158 arranged so that the voltage impressed across secondary winding 152$^b$ lags the anode voltage of tube 150 by ninety electrical degrees.

The bias potentiometer 140 in the long-tailed pair circuit 19 is adjusted so that when no signal is applied to control electrode 130$^c$, a potential approximately equal to the peak alternating voltage induced in winding 152$^b$ is applied between control electrode 150$^c$ and cathode 150$^b$. The control electrode 150$^c$ is negative with respect to cathode 150$^b$. Thus tube 150 does not fire. As the signal applied to control electrode 130$^c$ is increased, the output voltage of the long-tailed pair is diminished to zero and then increases in direction of reversed polarity to approximately the peak value of the alternating voltage induced in winding 152$^b$ at full signal. At full signal on control electrode 130$^c$, tube 150 is turned full "On."

Anode power for tube 150 is supplied from source L3, L4 through an anode transformer 160. Anode 150$^a$ of tube 150 is connected through a load resistor 162 to one end of the secondary winding 160$^b$ of transformer 160. The anode 150$^a$ is also connected to one end of primary winding 68$^a$ of transformer 68. The other end of winding 68$^a$ is connected to the center-tap of the secondary winding 160$^b$; and the other end of the latter is connected to cathode 150$^b$.

The secondary windings 160$^b$ and 9$^b$ of transformers 160 and 9, respectively, are connected so that the anode voltage applied to tube 150 is in phase with the anode voltage applied to tube 60. The voltage drop across primary winding 68$^a$ varies with the voltage induced in secondary winding 160$^b$ until tube 150 is fired. Thereafter, for the remainder of each half cycle when tube 150 is fired, the voltage drop across load resistor 162 opposes the voltage of secondary winding 160$^b$ in the loop circuit which includes winding 68$^a$, load resistor 162 and one-half of secondary winding 160$^b$. Thus the voltage across winding 68$^a$ is reversed in phase when tube 150 is fired and its wave shape is similar to the wave shape of the anode-cathode voltage of tube 150. This voltage wave shape is inverted in transformer 68 and applied between control element 60$^c$ and cathode 60$^b$ of tube 60.

The use of the long-tailed pair circuit 19 in conjunction with quadrature phase-shift and variable unidirectional voltage thyratron control circuit 17, provides large gain with improved stability and, with the remainder of the system, permits control of motor speed over a range of 100 to 1 or more with an accuracy of less than 0.5 percent error at the maximum speed. Also, the motor armature 3 circuit is isolated by transformers from the rest of the system and the cathode 60$^b$ of tube 60 does not have a common connection with cathode 150$^b$ of tube 150, thereby permitting this circuit to be grounded as shown.

Another, and very important advantage of the system illustrated, is that it may be readily and inexpensively adapted for operation from a polyphase alternating current source of supply by adding thyratron control tubes, corresponding to tubes 60 and 150, and phase-shift control circuits therefor in proportion to the number of added phases and without alteration of the remainder of the system.

While the system generally and the various control circuits hereinbefore described represent the best embodiment and form of the invention which I have devised, other control circuits and apparatus may be substituted for those specifically described without altering the basic method by which the system performs its speed control function. Said method involves measuring the difference between the actual speed of the motor and its desired speed. This may be done mechanically, as by the use of differential gearing or the like, or by electrical means. The difference measurement is modified in magnitude by an amount proportional to the amount by which the current flowing in the armature of the motor exceeds a selected amount. This is most easily, but not necessarily, accomplished by all-electrical means. The modified difference signal is represented as a voltage, and after suitable amplification is applied to both the armature and the field winding of the motor in a selected upper portion of the speed range of the motor in such manner that the actual voltage applied to each varies as a preselected function of the magnitude of said modified difference signal. In the remaining, or lower, portion of the speed range of the motor the voltage representing the modified difference signal is applied only to the armature of the motor. Thus by this method, certain of the steps of which may be performed by hand with the aid of meters or the like, information relative to actual and desired motor speed and armature current is combined into a single signal which is amplified and otherwise controlled so that all the data required for the control functions are subjected to like amplification and time delay. This single signal then is applied to both the armature and the field winding or to the armature alone as required.

These features and the fact that all said information may, by this method, be combined at a single point in the system enable control of motor speed with great accuracy and rapid speed response without instability.

I claim:

1. In a control circuit for an electrically powered motor having an armature and a field winding, means to afford a reference signal for controlling motor speed, means to afford a signal proportional to the speed of said motor and the current in the armature of said motor, means simultaneously responsive to each of said signals to afford a control voltage, means to vary the power supplied to said armature in proportion to said control voltage, means to vary the power supplied to said field winding in accordance with a predetermined value of said control voltage, and means in circuit with said motor and responsive to the speed thereof to render the last-mentioned means ineffective to vary the power supplied to said field winding over a selected speed range.

2. In a control circuit for an electrically powered motor having an armature and a field winding, means to afford a signal proportional to the difference between actual motor speed and desired motor speed, means to vary the voltage applied to the armature of said motor in accordance with said signal, and means to vary the current supplied to said field winding in accordance with a predetermined value of said armature voltage of said motor, said last-mentioned means comprising a bridge circuit comprising a first leg, a second leg and a center leg connected across said armature and having in said first leg a resistance element operable to maintain a fixed voltage thereacross, in said second leg a resistor for developing a voltage drop proportional to the voltage across said armature, and in said center leg a rectifier element polarized to prevent current flow therethrough until the voltage of said resistor exceeds said fixed voltage.

3. In a speed control system for a motor energizable from a source of electric power and having an armature and a field winding, in combination, means to vary the voltage applied to said armature, means to vary the current flow in said field winding in accordance with a predetermined value of said voltage applied to said armature and comprising means to afford a reference voltage proportional to the voltage applied to said armature, non-linear impedance means to afford a constant voltage, an asymmetric unit, and a control element associated with said field winding connected in circuit with said non-linear impedance means and said asymmertic unit and said means to afford a reference voltage to permit current flow in said control element proportional to the amount by which said reference voltage exceeds said constant voltage.

4. In a speed control system for a motor energizable from a source of electric power and having an armature and a field winding, said system including means to vary the voltage applied to said armature, means to vary the current supplied to said field winding, and means responsive to said armature voltage for controlling the last-mentioned means comprising, in combination, a voltage divider to afford a voltage proportional to the voltage applied to said armature, an impedance element and non-linear impedance means operative to afford a constant voltage thereacross connected in series circuit in parallel with said voltage divider, and an asymmetric unit and a control element connected in series circuit and bridging a point in said voltage divider with the connection between said impedance element and said non-linear impedance element and being operative to permit current flow in said control element proportional to the amount by which said voltage afforded by said voltage divider exceeds said constant voltage, said control element being associated with said field winding.

5. In a control system for a motor having an armature and a field winding for energization from a source of electrical power, in combination, means to afford a signal proportional to the amount by which the current in said armature exceeds a selected value, means to afford a signal proportional to the difference between the speed of said motor and the desired speed of said motor, means to vary the voltage applied to said armature in accordance with said signals, and means to vary the current supplied to said field winding in proportion to the amount by which the armature voltage exceeds a selected value.

6. In a control system for a motor having an armature and a field winding for energization from a source of electrical power, in combination, means to afford a signal voltage proportional to the amount by which the current in said armature exceeds a selected value, means to afford a signal voltage proportional to the difference between the speed of said motor and the desired speed of said motor, means responsive to said signals to vary the voltage applied to said armature in accordance with the difference between said signals, and means to vary the current supplied to said field winding in proportion to the amount by which the armature voltage exceeds a selected value.

7. The combination defined in claim 6 in which said means to afford a signal proportional to the amount by which the current in said armature exceeds a selected value comprises, in combination, an electron tube having an anode, a cathode, a first control element and a second control element, a linear impedance element connected in circuit with said means to afford a signal voltage proportional to the difference between the speed and the desired speed of said motor between said anode and said second control element, a source of constant unidirectional voltage and means to afford a voltage proportional to the current in said armature connected in series circuit from said second control element to said first control element, and circuit means connecting said cathode to an intermediate voltage point in said source of constant unidirectional voltage whereby the voltage drop appearing across said linear impedance element is varied in proportion to the position of said voltage point in said source of constant unidirectional voltage and the amount by which said voltage afforded by said means to afford a voltage proportional to the current flowing in said armature exceeds the portion of the voltage of said source of constant unidirectional voltage applied between said cathode and said first control element.

8. In combination, for connection to a source of variable unidirectional electric voltage, a voltage divider circuit for connection to said source, the series circuit combination connected in parallel circuit with said voltage divider, of a fixed impedance element and a regulating element of the type having a substantially constant operating voltage drop thereacross, and the series circuit combination connected to bridge a point in said voltage divider and the connection between said impedance element and said regulating element of an asymmetric element and an electrical output device, said asymmetric element being polarized to permit the flow of electric current away from said voltage divider and to prevent current flow toward said voltage divider, whereby the flow of electric current in said regulating element varies as a selected discontinuous function of said unidirectional electric voltage.

9. A spillover type circuit for connection to a source of variable unidirectional voltage to afford an output signal substantially proportional to said voltage for values of the latter greater than a selected value, comprising, a first and second linear impedance element for connection in series from one side of said source to the other side of said source, a third linear impedance element and a regulating element of the type having a substantially constant operating voltage drop less than said selected value of voltage thereacross connected in series for connection from said one side of said source to the other side of said source, and an asymmetric unit and an output element connected in series circuit to bridge the connection between said first and said second impedance elements with the connection between said third impedance element and said regulating element, the impedance of said first and said second impedance elements being so proportioned that the voltage drop across said second impedance element is equal to the operating voltage of said regulating element when said variable voltage is of said selected value, said asymmetric unit being polarized to permit current flow from and prevent current flow to said connection between said first and second impedance elements.

10. In a control circuit for an electrically powered motor having an armature and a field winding, an electric power source, means to afford a reference signal for controlling motor speed, means to afford a signal proportional to the speed of said motor and the current in the armature of said motor, means simultaneously responsive to each of said signals to afford a control voltage, means to vary the power supplied from said source to said armature in proportion to said control voltage, means to vary the power supplied to said field winding as a selected function of said control voltage, and means in circuit with said motor and responsive to the speed thereof to render said last mentioned means ineffective to vary the power supplied to said field winding over a selected speed range, said means to vary the power supplied from said source to said armature comprising first and second thyratron electron tubes each having an anode and a cathode and control electrode, a load impedance for each of said tubes and connected thereto respectively, the impedance for said second tube comprising said armature, a transformer having a winding connected to said power source and being connected in the anode circuit of said first tube in such manner that the voltage drop across said winding is reversed in phase when said tube is rendered conductive, said transformer having another winding connected in the control electrode circuit of said second tube, the control electrode of said first tube being connected for energization from a source of electrical power having the same frequency as and lagging by ninety electrical degrees in phase from the first mentioned power source, the control electrode and cathode of said first tube being connected to said means to afford a control voltage.

11. In a system for controlling over a selected speed range the speed of an electrically powered motor having an armature winding and a field winding, in combination, means for measuring the difference between the actual and desired speeds of the motor and providing an electrical signal proportional to the difference therebetween, means for modifying said signal in proportion to the degree in which the current in the armature winding of the motor exceeds a selected value, and means for applying the modified signal to the armature and field windings of the motor when said motor is operated at speeds within a preselected portion of the speed range of the motor and to said armature winding alone when said motor is operated at speeds within another preselected portion of the speed range of the motor.

12. The combination defined in claim 11, wherein the last mentioned means comprises means for applying voltages proportional in selected degree to the signal as modified to the armature and field windings of said motor over a preselected upper portion of said speed range and to said armature winding only over the remaining lower portion of said speed range.

13. The combination defined in claim 11 wherein the last mentioned means comprises phase-shift means responsive to said modified signal for applying a voltage proportional to the latter to the armature winding of said motor over a predetermined initial speed range of the motor and spillover circuit means responsive to said phase-shift means for applying a voltage proportional to said modified signal to the field winding of said motor over a predetermined higher speed range of the motor.

References Cited in the file of this patent

UNITED STATES PATENTS

| | | |
|---|---|---|
| 1,847,934 | Elder et al. | Mar. 1, 1932 |
| 2,031,509 | Seely | Feb. 18, 1936 |
| 2,330,638 | Stratton | Sept. 28, 1943 |
| 2,443,864 | Mac Auley | June 22, 1948 |
| 2,480,225 | Dale | Aug. 30, 1949 |
| 2,530,993 | Roman | Nov. 21, 1950 |
| 2,537,677 | Knauth | Jan. 9, 1951 |
| 2,550,105 | Cotner | Apr. 24, 1951 |
| 2,568,801 | Graham | Sept. 25, 1951 |
| 2,629,850 | McLane | Feb. 24, 1953 |
| 2,691,125 | Von De Wiel | Oct. 5, 1954 |

FOREIGN PATENTS

| | | |
|---|---|---|
| 672,686 | Great Britain | May 28, 1952 |